US011262725B2

(12) United States Patent
Frick et al.

(10) Patent No.: US 11,262,725 B2
(45) Date of Patent: Mar. 1, 2022

(54) METHOD AND SYSTEM FOR MONITORING A MANUFACTURING PROCESS AND CREATING AND UPDATING A WORKPIECE-SPECIFIC DATA SET

(71) Applicant: HOMAG GmbH, Schopfloch (DE)

(72) Inventors: David Frick, Neustetten (DE); Manuel Friebolin, Calw-Sth. (DE); Joachim Graf, Voehringen (DE); Andreas Kuehne, Voehringen (DE)

( * ) Notice: Subject to any disclaimer, the term of this patent is extended or adjusted under 35 U.S.C. 154(b) by 155 days.

(21) Appl. No.: 16/604,549

(22) PCT Filed: May 8, 2018

(86) PCT No.: PCT/EP2018/061810
§ 371 (c)(1),
(2) Date: Oct. 10, 2019

(87) PCT Pub. No.: WO2018/206548
PCT Pub. Date: Nov. 15, 2018

(65) Prior Publication Data
US 2020/0125064 A1    Apr. 23, 2020

(30) Foreign Application Priority Data

May 11, 2017  (DE) ...................... 10 2017 207 992.4

(51) Int. Cl.
*G05B 19/406*        (2006.01)
(52) U.S. Cl.
CPC .. *G05B 19/406* (2013.01); *G05B 2219/32119* (2013.01)
(58) Field of Classification Search
CPC ............... G05B 19/042; G05B 19/406; G05B 19/4184; G05B 2219/25294;
(Continued)

(56) References Cited

U.S. PATENT DOCUMENTS 6,671,569 B1 * 12/2003 Schoop .............. G05B 19/4183
700/112
7,103,506 B2 * 9/2006 Friedrich ......... G05B 19/41875
702/184
(Continued)

FOREIGN PATENT DOCUMENTS

DE    102008004603 A1    7/2009
DE    102014213423 A1    1/2016
(Continued)

OTHER PUBLICATIONS

Ramakrishna Perla et al, "An AR Inspection Framework: Feasibility Study with Multiple AR Devices", 2016 IEEE International Symposium on Mixed and Augmented Reality (ISMAR-ADJUNCT), IEEE, Sep. 19, 2016, pp. 221-226, XP033055451, DOI: 10.1109/ISMAR-ADJUNCT.2016.0080 [retrieved on Jan. 30, 2017] Abstract; Figures 1-3 p. 221-224, Paragraph 3.3.
(Continued)

*Primary Examiner* — Chun Cao
(74) *Attorney, Agent, or Firm* — Morgan, Lewis & Bockius LLP

(57) ABSTRACT

The present invention relates to a method for monitoring a manufacturing process, comprising the steps of: detecting a workpiece with a sensor unit of a portable device, sending the information acquired by the sensor unit to a database and applying a workpiece-specific data set, detecting the workpiece before, during and/or after carrying out a machining step or a handling step on the workpiece by the sensor unit of the portable device, updating the data set stored in the database before, during and/or after carrying out a machining step or handling step on the workpiece. The manufacturing process can, for example, relate to the machining of a board-shaped workpiece, such as a solid wooden board, a
(Continued)

chipboard, a MDF board, a HDF board, or a workpiece made of another wood material.

17 Claims, 2 Drawing Sheets

(58) Field of Classification Search
CPC ......... G05B 2219/32119; G06Q 10/06; G06Q 50/04; Y02P 90/02; Y02P 90/30
USPC ........................................................ 700/108
See application file for complete search history.

(56) References Cited

U.S. PATENT DOCUMENTS

| | | | |
|---|---|---|---|
| 2002/0069072 A1* | 6/2002 | Friedrich ............ | G05B 19/409 704/275 |
| 2008/0100570 A1* | 5/2008 | Friedrich ............ | G05B 19/409 345/156 |
| 2014/0125577 A1 | 5/2014 | Hoang et al. | |
| 2018/0130116 A1* | 5/2018 | Kraus ................ | G06Q 30/0631 |
| 2019/0240703 A1* | 8/2019 | Kiefer .................... | B25J 9/1697 |

FOREIGN PATENT DOCUMENTS

| | | |
|---|---|---|
| DE | 102015204181 A1 | 9/2016 |
| EP | 2107506 A1 | 10/2009 |
| WO | WO-0196829 A1 | 12/2001 |
| WO | WO2014139761 * | 9/2014 |
| WO | WO-2014139761 A1 | 9/2014 |
| WO | WO2015140043 * | 9/2015 |
| WO | WO-2015140043 A1 | 9/2015 |

OTHER PUBLICATIONS

Re Guido Maria et al, "An Augmented Reality Framework for Supporting and Monitoring Operators during Maintenance Task," Jun. 22, 2014, Virtual, Augmented and Mixed Reality, Applications of Virtual and Augmented Reality, 6th International Conference, VAMR 2014, Held as Part of HCI International 2014, Proceedings, LNCS 8526, XP047295584, ISSN: 0302-9743 ISBN:978-3-030-00888-8, abstract, figures 1-6 p. 443, paragraph 1—p. 452, paragraph 5.

* cited by examiner

METHOD AND SYSTEM FOR MONITORING A MANUFACTURING PROCESS AND CREATING AND UPDATING A WORKPIECE-SPECIFIC DATA SET

FIELD OF THE INVENTION

The present invention relates to a method for monitoring a manufacturing process. The manufacturing process can, for example, involve the machining of a panel-shaped workpiece, such as a solid wood panel, a chipboard, an MDF panel, an HDF panel, or a workpiece made of another wood-based material. Such a workpiece can be used in the furniture or construction element industry.

DESCRIPTION OF THE PRIOR ART

The sharp rise in demand for furniture products that are individually tailored to a specific customer, such as complete kitchen and bathroom furniture arrangements, requires the respective manufacturer to respond flexibly to individual customer requirements and produce accordingly. Consequently, individualized manufacturing means that individual data must also be created, monitored and updated for the individual manufacturing steps, since a corresponding data set must be maintained not only for a batch of identical workpieces, but also for each individual workpiece.

Updating the data set poses a great challenge because, on the one hand, workpiece-related data changes with every machining operation (e.g. the width of a workpiece is reduced by a cut) and, on the other hand, such an update should ideally take place immediately.

An additional challenge arises when manufacturing components in a working environment in which machining devices are not linked by transport units, but an employee intervenes manually in the manufacturing process. The handling and transport of the workpieces between different machining steps or machining devices leads to the fact that the real production sequence is decoupled from the currently stored data of the workpiece, since the sequence and the time at which the workpieces arrive at a respective machining device are variable and influenced by humans.

In order to ensure the recognition of workpieces in such a working environment, it is known that workpieces are identified by means of a barcode or label. However, it is disadvantageous that a label applied to the workpiece can be removed, or is removed in the course of machining, for example if the corresponding section of the workpiece is cut off. Marking with a printed barcode may be undesirable in general.

SUBJECT MATTER OF THE INVENTION

The aim of the present invention is to provide a method that further reduces the disadvantages occurring in the individualized production of workpieces and/or increases process reliability.

The subject matter of claim 1 provides a corresponding method. Other preferred embodiments are listed in the dependent claims.

The method in accordance with the invention comprises the following steps: detecting a workpiece with a sensor unit of a portable device, sending the information detected by the sensor unit to a database and creating a workpiece-specific data set, detecting the workpiece before, during and/or after carrying out of a machining step or a handling step on the workpiece by the sensor unit of the portable device, updating the data set stored in the database before, during and/or after carrying out a machining step or handling step on the workpiece.

The said workpiece may be a panel-shaped workpiece or a workpiece having free-form surfaces, in particular a solid wood panel, a chipboard, an MDF panel, an HDF panel, or a panel made of composite materials.

It is preferred that the portable device is data goggles, a tablet computer, a mobile phone, a data glove or a Smartwatch.

The advantage of data goggles is that the user can always carry them with him and retrieve information as required, which is displayed directly in his field of vision. With data goggles, information can be displayed in an "augmented reality". Further advantages of data goggles are described below.

With a tablet computer, a mobile phone (smartphone) or a Smartwatch, several functions can be combined in a portable device. The devices mentioned are designed in such a way that a user can always carry such a device with him.

A data glove can be used for both information retrieval and gesture control or, if the data glove itself is equipped with a display device, for information display.

It is preferred that the portable device displays to the user instructions for action, warnings, confirmation of an activity and/or a control panel for activating, operating and/or monitoring a machining device, in particular in "augmented reality". Thus the "workstation" of the user can be carried along and different functions are always available.

It is preferred that the workpiece is detected contactlessly, in particular by means of the sensor unit designed as a camera, further preferred by a 3D camera. In this way, workflows can be further accelerated.

In one embodiment, it is provided that the detection of the workpiece is performed based on at least one workpiece dimension, such as the width, height, thickness and/or area of one side of the workpiece, the color of the workpiece, the degree of gloss of the workpiece surface, a material property, an edge material, a coating and/or the groove or drilling pattern of the workpiece. The determined information can be summarized in a data set and used for identification.

Furthermore, it is preferred that the portable device has a data transmission module for wireless data transmission, which is in particular integrated into a local network. This makes the portable device extremely flexible to use.

According to another variant, it is preferred that the portable device includes a position sensor. Thus the position of the portable device can be determined. For example, a triangulation method is used.

The portable device also preferably has one or more acceleration sensors so that the orientation of the portable device can be determined on the basis of the measured values of the acceleration sensors. If the portable device is data goggles, the orientation of the portable device corresponds to the direction of the user's gaze.

By combining the information about the position of the portable device and the orientation (especially the viewing direction), the position of the workpiece can be derived.

In addition, the portable device may have an audio system with a voice control function, further simplifying operability.

A data glove may also be provided which interacts with the portable device, in particular for gesture control. For example, a data glove enables gesture control outside the user's field of vision. In addition, a data glove can be used in an alternative or additional application to provide haptic feedback to the user.

Such a data glove can advantageously be used with data goggles as a portable device in order to further increase the possibilities of use for the user.

The machining or handling step on the workpiece can be selected from: cutting the workpiece (W) to size, machining the edges, grinding, laminating, painting, drilling a hole, applying a coating material, in particular an edge material, printing the workpiece, attaching a fitting, transporting, stacking, packaging or tracking the assembly of elements or assemblies.

Furthermore, the invention relates to a system, in particular for carrying out a method according to one of the previous embodiments. The system comprises: a portable device having a sensor unit, in particular a camera, which is adapted to detect a workpiece before, during and/or after a machining step or a handling step has been carried out and to determine and transmit information obtained on the device side about the workpiece, and a production control system having a database, wherein the production control system is arranged to create a workpiece-specific data set in the database based on the transmitted information obtained on the device side or to update a workpiece-specific data set stored in the database.

It is preferred that the portable device is data goggles, wherein further preferably a data glove for gesture control is provided.

It is further preferred that the portable device comprises an audio system with a voice control function. Thus the operability can be further simplified.

DETAILED DESCRIPTION OF THE PREFERRED EMBODIMENT

In the following, a preferred embodiment of the present invention is explained in detail by means of the enclosed figures. Further modifications of certain individual features mentioned in this context can be combined with each other to form new embodiments.

The present embodiment is directed towards a manufacturing process for machining a workpiece which consists at least in sections of wood or wood-based materials, e.g. a solid wood panel, a laminated wood panel, a chipboard, an MDF panel, an HDF panel or the like. Such workpieces are preferably used in the furniture and construction element industry. For example, this can concern a kitchen worktop, a shelf, a floor panel, a door or the like.

Figure 1:
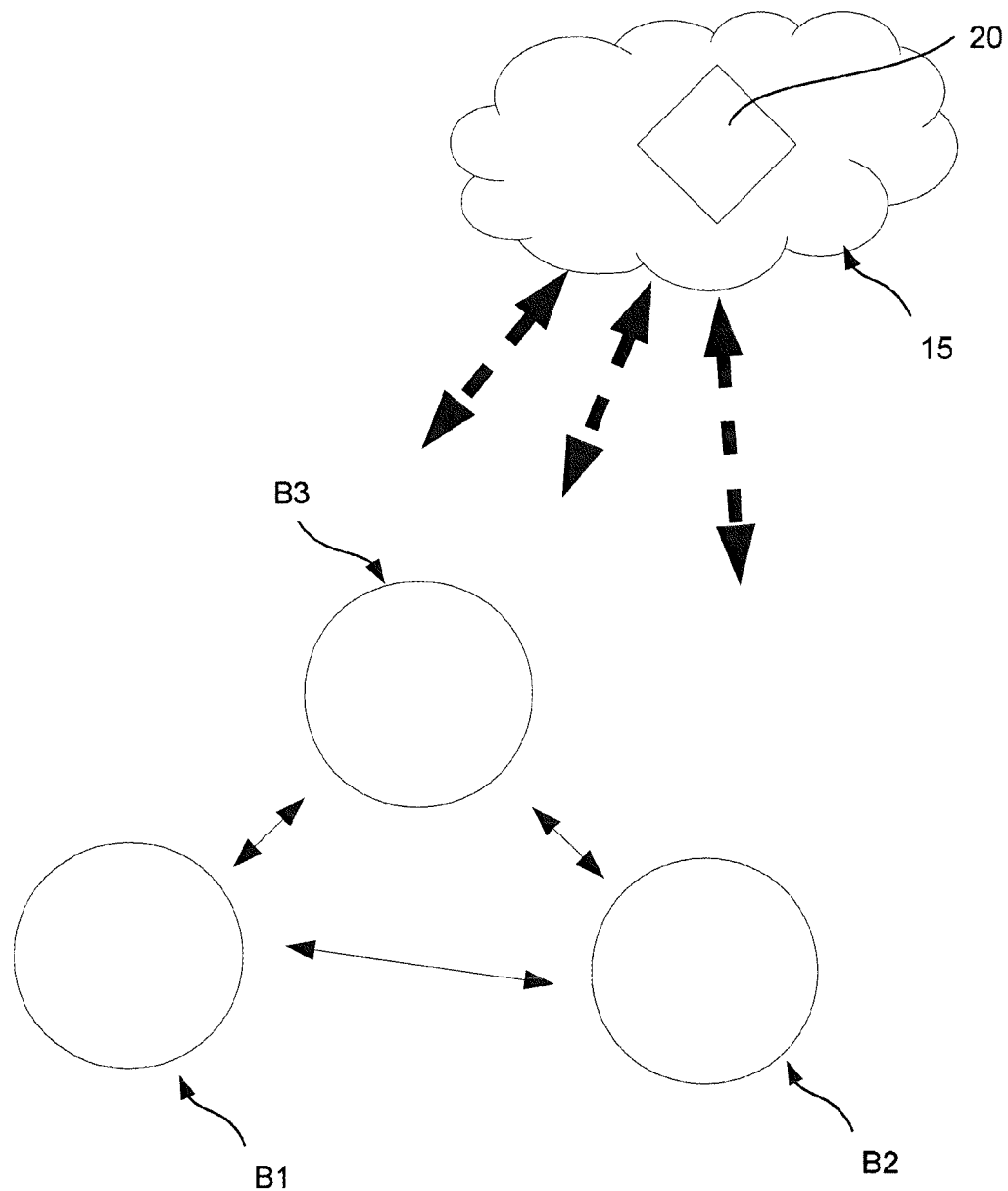
FIG. 1 shows a schematic view of individualized production processes and their monitoring.

In manufacturing processes in which the workpiece handling and workpiece transport are at least partially carried out by employees, the individual machining devices or stations can be regarded as islands in the manufacturing process. FIG. 1 schematically depicts such a working environment in which individual machining devices B1-B3 are spatially separated from each other. A production control system 15 monitors the operation of the machining devices B1-B3.

Figure 2:
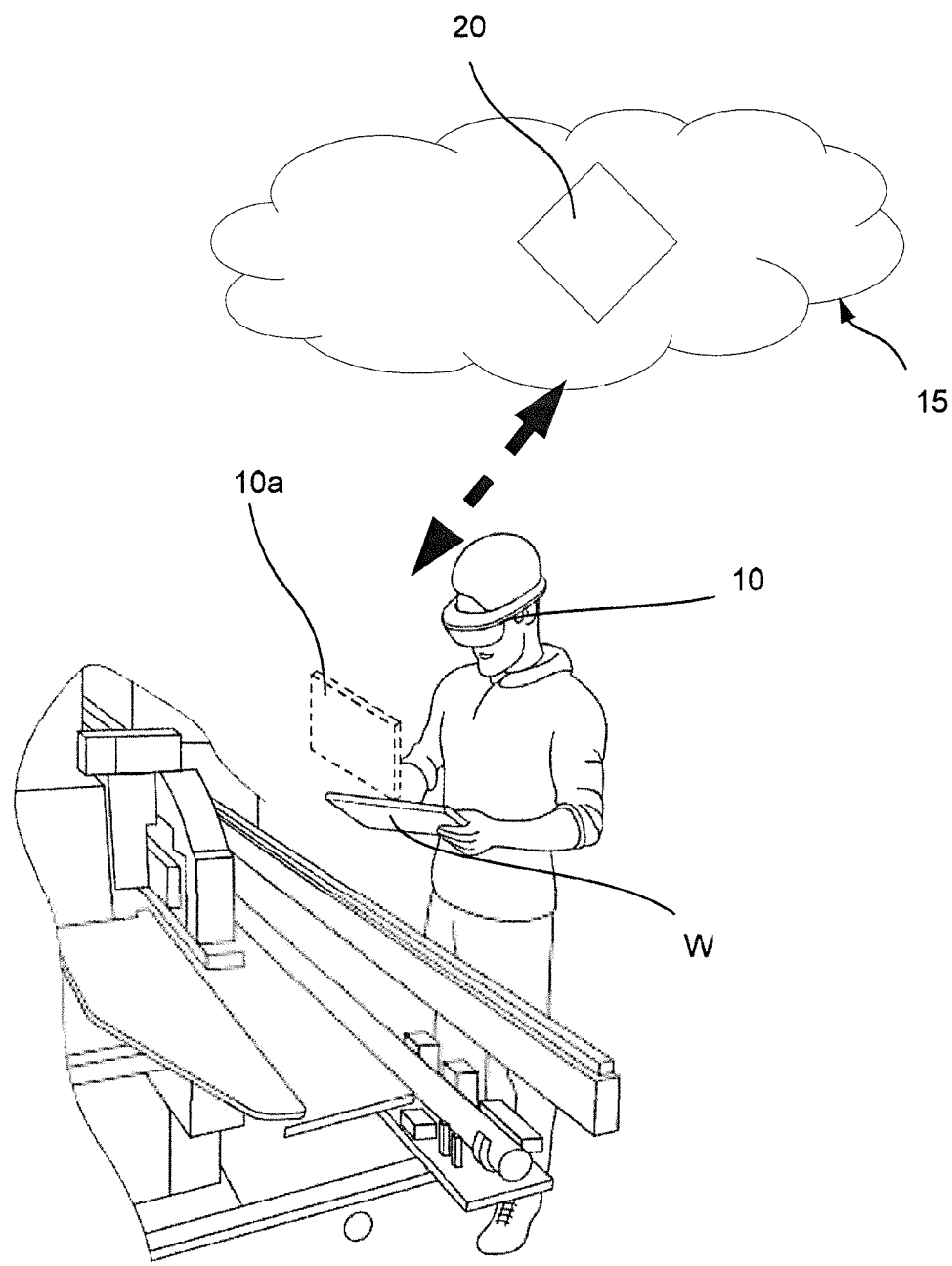
FIG. 2 shows a workpiece identification with a portable device.

The removal and loading of workpieces W on the machining devices B1-B3 is carried out by an employee (see FIG. 2). The workpieces are either moved individually from one machining device to the next, or the workpieces W are combined in a transport container for transport.

The sequence in which the stack with the several workpieces finally arrives at one of the machining devices B1-B3 is not secured, but is influenced by the activities of the employee. Furthermore, there is no monitoring whether manipulations take place on the stack during transport.

According to the present invention, a portable device 10 (smart device) is integrated into the workpiece handling and transport. In this embodiment example, the portable device is data goggles 10 with a sensor unit, in particular a camera. The data goggles 10 can be used to show the user a virtual display or virtual touch screen 10a, shown schematically in FIG. 2. In the following, general reference is made to "data goggles".

The data goggles 10 are connected to a database 20 of the production control system 15 via a wireless data connection and can be used to determine the identity of a workpiece W, among other things, by means of the camera.

The data goggles 10 have a data transmission module for this purpose, which is preferably integrated into a local network. For example, the local network may be a wireless local area network (WLAN). Thus, if the production hall is equipped accordingly, there is always a data connection between the data goggles 10 and the production control system 15, which is preferably executed on a central server and comprises the database 20.

As long as a workpiece W is present within a machining device or within a system composed of several machining devices and transport systems, workpiece-specific data can be communicated to the database 20, since a digital twin of the workpiece is "carried along" in the database 20 parallel to the machining of the real workpiece in the production control system 15.

As soon as an employee intervenes in the manufacturing process, a workpiece W is detected by the data goggles 10 or their camera (e.g. 3D camera) and compared with the corresponding data set in the database. In addition, it is possible to detect changes to the workpiece W, such as a reduction in the size of the workpiece W by cutting off a section, and to update the workpiece-specific data set.

In particular, the type of handling step, the position of the intervention, etc. is recognized, since the data goggles 10 are equipped with the corresponding sensors. In addition to the camera already mentioned, the data goggles have a sensor for determining the position of the data goggles 10 (in particular triangulation procedures, for example via Bluetooth or the WLAN network). Acceleration sensors may also be used to detect accelerations in order to determine the direction of the user's gaze. By combining the position data of the data goggles and the information regarding the viewing direction, the position of the detected workpiece can be determined.

Since the portable device is data goggles 10, the sensors are not fixed in place, but are carried by the employee to any position. In this way, it is determined where and how the employee intervenes in the manufacturing process, even at undefined points (i.e., not only at the entrance and exit of a machining device).

For example, the employee can first carry out a workpiece transport and change the sequence of the workpieces W in the workpiece stack during the transport. The data goggles 10 that are carried along or their sensors detect the manipulation and inform the production control system 15 of the changed situation. As a result, the workpiece-specific data set is updated in database 20 of the production control system 15.

In addition, the employee has the option of having relevant data displayed directly on a workpiece W, such as the machining history, instructions for the next work step, safety instructions, etc., through the data goggles.

If required, workpiece-specific data can be changed directly without having to access an operator terminal.

In addition, the data goggles 10 offer the possibility of changing workpiece-specific data and making settings on the machine in parallel. A virtual display 10a is shown to the employee for this purpose. The employee can interact with projected content. The interaction can take place through gestures as well as through voice control.

One application in the case of data goggles 10 is the virtual display 10a (e.g. virtual touch screen), in which the machine is operated with a projection of the user interface of the operator terminal of the machine at the momentary location of the operator.

In order to further increase user-friendliness, the user interface can be projected onto a surface such as a workpiece, machine or employee's hand, which provides haptic feedback through the surface during interaction. In concrete terms, it would be possible to program the machining directly on the workpiece on a clamped workpiece in a CNC machine. Alternatively, during maintenance work on a machining device, it is possible to create the user interface on the machine housing remote from an operator terminal.

When transporting the workpieces in production, the employee can be given a kind of navigation to the next machining device. The position of the transported workpieces can be derived from the position of the employee, which workpieces can then be tracked.

Navigation is not limited to the transport of workpieces in production, but can also lead the employee to faults within the system or mark them and interactively assist in troubleshooting there. If the cause of the fault is known, the procedure for solving the fault condition can be visualized directly to the employee. Furthermore, a video chat with a remote service employee is possible using the data goggles 10. Corresponding information can be displayed via the virtual display 10a, which is shown schematically in FIG. 2.

Automatic documentation of the maintenance is possible via the sensors, and it is also possible to check whether the assembly of safety-relevant components was carried out properly. The production readiness of the machine or plant can thus be restored more quickly and the downtimes of the production process can be shortened.

When navigating to trouble spots, it is also conceivable that skills can be assigned to individual employees in production. If the fault and the type of fault are known, an employee with the necessary skills can be alarmed and guided to the fault. This avoids that several employees have to be tied up and that the specialist for this type of fault has to be found first.

In the course of maintenance work, when parts of a machine and thus safety functions are switched off, danger points (in the field of vision) can be marked by the portable device, in particular data goggles 10, and thus safety can be increased.

In addition, the machining quality and its completeness can be checked as a further advantage by the data goggles 10. For example, it can be determined whether the dimensional accuracy prescribed by a previous machining step was maintained and whether certain machining steps were carried out, e.g. whether the corresponding drilled holes are available at certain positions, whether a certain edge material was applied, whether the edge material matches the covering material of the workpiece, whether certain radii with corresponding dimensional accuracy were applied in the workpiece, whether secondary parts were attached to the workpiece in the correct manner and in the correct positions (hinges), etc.

In a further embodiment, machine learning is possible during quality control by means of data goggles 10. If the quality is no longer within the tolerance range during inspection, machine settings must be changed or maintenance work carried out. Experienced employees can use the data goggles 10 to learn which parameters influence the workpiece quality and how. If the sensors make it possible to check the quality characteristics of the workpieces, proposals can be made for machine optimization to restore product quality according to requirements.

In the following an example of a procedure of the method is described. Within the scope of the described method, the aforementioned data goggles 10 are used, which have a camera with which a workpiece W and its properties can be identified. In addition, the data goggles 10 can be used to display to the user "augmented reality" instructions for action, warnings or a control panel for activating, operating and monitoring a machining device.

For example, the employee can be shown the sequence in which certain workpieces are to be fed to a machining device and the orientation in which they are to be fed into the machine as instructions for action. For example, a note stating that an incorrect execution of a previous work step has been determined and that the employee is offered a correction proposal is also to be assigned to the instructions for action.

Since the employee always carries the data goggles 10 with him, they can be used for assistance in the entire manufacturing process.

If a workpiece is recognized that has not yet been assigned an identity, the sensor unit of the data goggles can be used to determine the properties of the workpiece, for example using a 2D or 3D camera. The identity of the workpiece can be determined using workpiece-specific parameters or it can be defined which parameters characterize the workpiece. These include workpiece dimensions (width, height, thickness), color, surface properties, degree of gloss of the workpiece surface, a material property, an edge material, a coating and/or the groove or hole pattern of the workpiece. If the properties of a workpiece are detected by the sensors of the data goggles, these can be used to determine the identity.

First, an employee manually removes a new workpiece W from a workpiece stack. The workpieces in the workpiece stack are not yet stored in database 20 of the production control system 15. The camera of the data goggles optically recognizes the workpiece and assigns or creates an individualized identifier or an individualized data set for the workpiece W. The production control system 15 thus knows the new workpiece W, which is now to find its way into the manufacturing process.

The employee now carries the workpiece W to a first machining device B1, with which the workpiece W is to be cut to a certain size. After the employee has inserted the workpiece W into the machining device B1, the machining steps are carried out according to the order. Sensors of the machining device recognize the workpiece W and document the execution of the corresponding machining steps. Based on this information, the workpiece-specific data set in database 20 is updated.

After the individual machining steps have been carried out, the workpiece W is conveyed out of the first machining device B1. At this point, the employee has the option of removing the workpiece W and feeding it to a second B2 machining device.

In this example, the transport takes place between the first machining device B1 and the second machining device B2 with a transport unit (for example, a transport carriage). Several workpieces are first stacked on the transport unit by the employee. After a certain number of workpieces have been collected on the transport unit in this way, the employee can decide at his own discretion to feed the stacked workpieces to the second machining device B2.

After the employee has reached the second machining device B2 with the transport unit, the employee will pick up the workpieces individually and feed them to the second machining device B2 in a loading or infeed area.

The employee's data goggles 10 recognize which workpiece W the employee is picking up in that the camera of the data goggles 10 recognizes the workpiece W and compares it with the last stored data of the individualized data set.

After the workpiece W has been assigned in this way, the employee can insert the workpiece W into the second machining device B2, and certain machining operations are carried out in the second machining device B2 based on an order list stored for the individualized data set.

For example, the narrow sides of the workpiece W are provided with an edge material. Since the workpiece W has several narrow sides, these machining operations usually take place in rotation on such a machine. This means that, after a first narrow side has been provided with an edge material, the workpiece is fed back to the infeed area of the machining device via a transport system and, in a second pass through the second machining device B2, the workpiece W is provided with an additional edge material.

The second machining device B2 is informed via the production control system 15 in which process stage the workpiece W is, in particular how many sides have already been provided with an edge material, or whether a further run through the second machining device B2 is necessary.

After the machining has been carried out on the second machining device B2, the employee has the possibility to pick up the workpiece W in the exit area of the second machining device B2.

The corresponding workpiece W is now identified by means of the data goggles 10. In addition to workpiece identification, it is also possible to check whether the machining steps commissioned for the second machining device B2 have been carried out correctly and completely, e.g. whether all narrow sides are provided with an edge material and whether the machining quality meets certain requirements.

In this embodiment example, a third machining device B3 is provided as an example to which the employee can feed the workpiece W. The number of machining devices is not limited.

In addition, it is possible for the workpiece W to be fed back to the first machining device B1 or the second machining device B2 after machining by the third machining device B3, for example in order to carry out a further cut such as drilling.

The invention claimed is:

1. A method for monitoring a manufacturing process, the method comprising:
   detecting a workpiece with a sensor unit of a portable device;
   transmitting information detected by the sensor unit to a database and creating a workpiece-specific data set;
   detecting the workpiece before, during or after carrying out a machining step or a handling step on the workpiece by the sensor unit of the portable device; and
   updating the workpiece-specific data set stored in the database before, during or after carrying out the machining step or the handling step on the workpiece.

2. The method according to claim 1, wherein the portable device is data goggles, a tablet computer, a mobile telephone, data glove or a smartwatch.

3. The method according to claim 1, wherein the portable device displays instructions for action, warnings, a confirmation of an activity or a control panel for activating, operating or monitoring a machining device in an augmented reality.

4. The method according to claim 1, wherein the workpiece is detected in a contactless manner, by means of the sensor unit designed as a camera that comprises a 3D camera.

5. The method according to claim 1, wherein the detection of the workpiece is carried out based on at least one workpiece dimension that comprises a width, a height, a thickness or a surface area of one side of the workpiece, a color of the workpiece, a degree of gloss of a surface of the workpiece, a material property, an edge material, a coating or a groove or drilling pattern of the workpiece.

6. The method according to claim 1, wherein the portable device has a data transmission module for wireless data transmission, which is integrated into a local network.

7. The method according to claim 1, wherein the portable device comprises a position sensor, wherein a position is determined at a time of detecting the workpiece.

8. The method according to claim 1, wherein the portable device comprises one or more acceleration sensors.

9. The method according to claim 1, wherein the portable device comprises an audio system with a voice control function.

10. The method according to claim 2, wherein the data glove can interact with the portable device for gesture control.

11. The method according to claim 1, wherein the workpiece is a panel-shaped workpiece or has free-form surfaces, and wherein the workpiece comprises a solid wood panel, a chipboard, an MDF panel, an HDF panel, or a panel made of composite materials.

12. The method according to claim 1, wherein the machining step or the handling step on the workpiece is selected from: cutting the workpiece to size, machining edges, grinding, laminating, painting, drilling a hole, applying a coating material, printing the workpiece, attaching a fitting, transporting, stacking, packaging or assembling components, and wherein the coating material comprises an edge material.

13. A system, comprising:
   a portable device with a sensor unit, wherein the portable device is configured to detect a workpiece before, during or after a machining step or a handling step has been carried out on the workpiece and to determine and transmit information about the workpiece; and
   a production control system having a database, wherein the production control system is configured to create a workpiece-specific data set in the database based on the transmitted information about the workpiece and to update the workpiece-specific data set stored in the database,
   wherein the system is configured to monitor a manufacturing process.

14. The system according to claim 13, wherein the portable device comprises data goggles, and wherein the portable device comprises a data glove that is provided for gesture control.

15. The system according to claim 13, wherein the portable device comprises an audio system with a voice control function.

16. The method according to claim 1, wherein transmitting the information and creating the workpiece-specific data set comprise transmitting the information about the workpiece detected by the sensor unit to the database and creating the workpiece-specific data set in the database based on the transmitted information about the workpiece.

17. The system according to claim 13, wherein the sensor unit comprises a camera, wherein the portable device is configured to detect a change in a dimension of the workpiece, and wherein the production control system is configured to update the workpiece-specific data set stored in the database based on the detected change in the dimension of the workpiece.

* * * * *